3,829,515
PRODUCTION OF CYCLOALKYLAROMATICS
Ernest A. Zuech, Marvin M. Johnson, and Gerhard P. Nowack, Bartlesville, Okla., assignors to Phillips Petroleum Company
No Drawing. Filed Feb. 21, 1973, Ser. No. 334,387
Int. Cl. C07c 15/12
U.S. Cl. 260—668 R    11 Claims

ABSTRACT OF THE DISCLOSURE

Cycloalkylaromatics are produced from aromatic hydrocarbons in the presence of hydrogen and a ruthenium halide-active clay catalyst promoted with at least one compound of iron, cobalt and nickel. Preferably, the catalyst is not heated under calcination conditions prior to use. In a specific embodiment, benzene is converted to cyclohexylbenzene with good selectivity over an active clay impregnated with ruthenium chloride promoted with at least one compound of iron, cobalt and nickel followed by solvent removal under conditions which do not result in calcination of the catalyst composition.

---

This invention relates to the conversion of aromatic hydrocarbons to cycloalkylaromatics and/or alkyl-substituted cycloalkylaromatics. In accordance with one aspect, this invention relates to an improved process and catalyst for conversion of benzene to cyclohexylbenzene over a catalyst comprising a ruthenium-active clay catalyst modified with at least one compound of iron, cobalt or nickel. In accordance with another aspect, this invention relates to an improved catalyst for the conversion of aromatics to cycloalkylaromatics which catalyst has been prepared by impregnation of an active clay with an alcoholic or aqueous solution of a ruthenium halide and at least one compound of iron, cobalt and nickel followed by heating at an elevated temperature sufficient to remove the solvent but insufficient to subject the catalyst composition to calcination conditions.

Methods are available in the art for the coupling of aromatic nuclei in the presence of molecular hydrogen to produce an at least partially hydrogenated dimer derivative of the aromatic reactant. For example, benzene is converted at elevated temperature to a mixture containing cyclohexylbenzene in the presence of various catalysts. Cyclohexylbenzene is known as a valuable solvent and chemical intermediate. It can be converted in high yield to phenol and cyclohexanone by autooxidation with subsequent acid treatment. None of the prior art methods for producing cyclohexylbenzene have yet been proven for a stable continuous operation necessary for commercial exploitation. Problems therewith include high catalyst cost, catalyst stability and regeneration.

In accordance with the invention, there has been discovered a process utilizing an improved ruthenium-clay catalyst which provides not only excellent selectivity for the conversion of aromatics to cycloalkylaromatic hydrocarbons, but which is suitable for continuous operation.

Accordingly, an object of the present invention is to provide an improved process for the conversion of aromatic hydrocarbons to cycloalkylaromatic hydrocarbons.

Another object of the invention is to provide an improved process and catalyst for the production of cyclohexylbenzene from benzene.

A further object of this invention is to provide an improved ruthenium catalyst exhibiting excellent selectivity for the conversion of benzene to cyclohexylbenzene.

Other objects and aspects, as well as the several advantages of the invention, will be apparent to those skilled in the art upon reading the specification and the appended claims.

In accordance with the invention, a process is provided for producing cycloalkylaromatics and alkyl-substituted cycloalkylaromatics from aromatic hydrocarbons by contacting a monocyclic aromatic hydrocarbon or alkyl-substituted monocyclic aromatic hydrocarbon with hydrogen in the presence of a ruthenium-active clay catalyst promoted with at least one compound of iron, cobalt and nickel.

In accordance with a preferred embodiment, a catalyst exhibiting excellent selectivity for the conversion of benzene to cyclohexylbenzene is prepared by impregnating an active clay with an alcoholic or aqueous solution of a ruthenium halide and a salt of at least one of iron, cobalt or nickel followed by heating to remove solvent under noncalcination conditions.

In another embodiment of the invention, benzene is converted to cyclohexylbenzene with good selectivity over a ruthenium chloride-active clay catalyst promoted with at least one compound of iron, cobalt and nickel, which catalyst has been prepared by impregnation of the active clay with an ethanolic solution of ruthenium trichloride and a chloride of at least one of iron, cobalt and nickel followed by heating to remove solvent and dry the catalyst under conditions which are not conducive to calcination of the catalyst. The catalyst is preferably used in tablet form although the impregnated powder is suitable. As is demonstrated by the specific working examples herein, benzene is converted to cyclohexylbenzene with good selectivity over the inventive catalyst composites.

The feedstocks which are suitable for use in the present invention are aromatic compounds, i.e., monocyclic aromatic hydrocarbons and alkyl-substituted monocyclic aromatic hydrocarbons. Some specific examples of these are benzene, toluene, the xylenes, and the like, and mixtures thereof.

The aromatic conversion according to the invention can be carried out in the presence of the above-described catalyst at temperatures as low as 100° C. and under hydrogen pressures as low as 100 p.s.i.g. The reaction temperature can be as high as 250° C., but it is preferred that no higher than 175° C. be employed. Hydrogen pressures not exceeding 1,000 p.s.i.g. are also preferred, although hydrogen pressures up to about 2,000 p.s.i.g. can be used. Space velocity defined as volume of the liquid feed per volume of catalyst per hour (LHSV) should be at least 0.5 and not over about 20. However, it is preferable that the LHSV be at least 2 and not above about 15.

The present process is effected in the presence of a supported ruthenium catalyst promoted with at least one compound of iron, cobalt and nickel. The ruthenium and metal promoters are applied to the active clay support material as an alcoholic or aqueous solution of a metal halide salt, preferably the metal chloride. Following impregnation of the active clay with a solution of the ruthenium halide salt and metal promoter halide salt, the solvent can be removed in vacuo at ambient temperatures, say about 25° C. The impregnated clay can be further dried by heating at temperatures in the range 110–120° C. although temperatures of up to about 380° C. can be used. The heating is continued under conditions and for a period of time sufficient to remove substantially all of the solvent, but insufficient to calcine the catalyst composite. Alternatively, tablets of the active clay support can be treated with a ruthenium halide solution also containing a promoter metal halide in the solution by means of an atomizing spray.

As indicated above, the support materials for the catalyst of the invention include the montmorillonite clays which preferably have been compacted as by tableting or extrusion. Good results are obtained when a support characterized by montmorillonite structure is impregnated with an alcoholic or aqueous solution of the metal halides followed by heating to remove the solvent. Filtrol Grade 71 clay is an especially good commercially available montmorillonite clay for forming catalysts of this invention. A commercially available extruded montmorillonite clay, Filtrol Grade 49 which has the same composition as Filtrol Grade 62, can also be employed in this invention.

The montmorillonite clays suitable for this invention are preferably employed in a compacted state although finely divided powders can also be impregnated if desired. The compacted state for montmorillonite clays can be achieved by two general methods which are well known in the art. First, there is a method whereby essentially dry (chemically bound water can be present) powdered clay in the presence of a lubricant such as graphite is formed into tablets, pills, pellets, and the like by conventional means. The second general method involves the use of a slurry, paste or dough of the montmorillonite clay admixed with a volatile liquid, usually water, to form shaped and compacted montmorillonite pellets, or extruded shapes such as cylinders, tubes and the like by conventional means. Regardless of which method is employed, for the purposes of this invention the final compacted montmorillonite clay in the form of a tablet, pellet or the like has a crushing strength of from 3–15, preferably from 5–10, pounds.

A typical analysis of dry Filtrol Grade 71 clay powder suitable for employment in the practice of the present invention is as follows: 71.2% $SiO_2$, 16.5% $Al_2O_3$, 3.6% $Fe_2O_3$, 3.2% MgO, 2.6% CaO, 1.3% $SO_3$, 1.0%

$$(K_2O + Na_2O)$$

and 0.6% $TiO_2$ (analysis on a volatile free basis).

Suitable clays are available commercially as, for example, Filtrol Grade 71, Filtrol Grade 62, Filtrol 49, and the like (sold by Filtrol Corporation, Vernon, Calif.). Filtrol Grade 49 and Filtrol Grade 62 clays have the following analysis: 74.0% $SiO_2$, 17.5% $Al_2O_3$, 4.5% MgO, and 1.4% $Fe_2O_3$. Samples of Filtrol Grade 49 and Filtrol Grade 62 were analyzed by the supplier after heating the Filtrol samples at 1700° F. In this heat treatment Filtrols 49 and 62 lost, respectively, 17% and 5% volatiles.

The catalysts of the invention will contain generally from about 0.01 to 2 weight percent, preferably 0.1 to 1 weight percent, ruthenium.

The amount of metal promoter present (cobalt, iron or nickel and mixtures thereof) ordinarily ranges from 0.001 to 3 weight percent, preferably from 0.05 to 1 weight percent. The weight ratio of ruthenium to promoter metal (Ni, Fe, Co) ordinarily ranges from 10:1 to 1:1.5, preferably from 1:0.5 to 1:1.

The present invention is advantageously practiced under substantially anhydrous conditions and can be carried out in a batchwise, semi-continuous or continuous operation. However, continuous operation is more suitable for commercial utilization. In a continuous process, the aromatic hydrocarbon-hydrogen feed can be passed over the fixed bed catalyst in an upflow or downflow manner.

The reaction can be conducted in the presence of or in the substantial absence of added reaction solvents or diluents. In the modification wherein added solvent is employed, the solvents which are liquid at reaction temperature and pressure and are inert to the catalyst, reactants and reaction products are suitably employed. Preferred solvents to be utilized in this modification are saturated hydrocarbons of from 6–16 carbon atoms, e.g., acyclic alkanes such as hexane, decane, octane, dodecane, and hexadecane, as well as cycloalkanes such as cyclohexane, cyclooctane, cyclododecane, and decahydronaphthalene.

The operability of the present invention is illustrated by Examples II–V. Example I is a control run. Examples I–V are summarized in Table I.

EXAMPLE I (A) Catalyst Preparation (Control Run)

One hundred ml. (85.9 g.) of Filtrol Grade 71 tablets (5 pounds crushing shrength) was heated in air for two hours at a temperature of 540–605° F. After this heat treatment, the material weighed 75.9 g. A 35 ml. (27.9 g.) portion of the tablets was treated with a solution of 0.36 g. ruthenium trichloride in 10 ml. of ethanol by means of an atomizing spray. Four 5 ml. portions of ethanol were passed through the atomizer to complete the transfer of the ruthenium trichloride onto the Filtrol Grade 71 tablets. The catalyst was allowed to dry at room temperature overnight.

(B) Cyclohexylbenzene Run 1 (Table 1)

A charge of 30 ml. (25.6 g.) of the above catalyst (0.5 wt. percent Ru) was placed in a ½-inch I.D. upflow tube reactor bedded with 30 ml. of 4 mm. glass beads, pressure checked, heated to 150° C. with hydrogen purge and pressured to 500 p.s.i.g. with hydrogen. Benzene was pumped in at a rate of 120 ml./hr. with a slight hydrogen flow during a reaction period of 8 hours. The reactor effluent was collected in a receiver which was changed at approximately one hour intervals, and the composition of each sample was determined by GLC analysis. The GLC analyses of samples taken during the last 4⅔ hours of the run were averaged and the results showed a 15.2% conversion based on benzene with a selectivity of 24% to cyclohexane and 60% to cyclohexylbenzene.

EXAMPLE II (A) Catalyst Preparation

A 35 ml. (27.9 g.) portion of Filtrol Grade 71 tablets was treated with a solution of 0.36 g. ruthenium trichloride and 0.06 g. nickel(II) chloride hexahydrate in 10 ml. of ethanol by means of an atomizing spray. Four 5 ml. portions of ethanol were passed through the atomizer to complete the transfer of the solution onto the Filtrol Grade 71 tablets. The catalyst was allowed to dry overnight at room temperature.

(B) Cyclohexylbenzene Run 2 (Table I)

A charge of 30 ml. (25.6 g.) of the above catalyst (0.5% Ru, 0.05% Ni) was placed in a ½-inch I.D. upflow tube reactor bedded with 28 ml. of 3 mm. glass beads and the tablets were covered with 15 ml. of 3 mm. glass beads. The reaction was carried out under the same conditions as in Example I for a period of 8⅓ hours. The GLC analyses of samples taken during the last 3⅓ hours of the run were averaged and the results showed a 12.5% conversion based on benzene with a selectivity of 22% to cyclohexane and 66% to cyclohexylbenzene.

EXAMPLE III (A) Catalyst Preparation

The catalyst was prepared as described in Examples I and II using a solution of 0.36 g. ruthenium trichloride and 0.30 g. nickel(II) chloride hexahydrate in 10 ml. of ethanol. This solution was sprayed onto 27.9 g. of Filtrol Grade 71 tablets.

(B) Cyclohexylbenzene Run 3 (Table I)

This run was carried out as were the runs in Examples I and II using 30 ml. (23.3 g.) of the catalyst (0.5 wt. percent Ru, 0.25 wt. percent Ni) prepared above. The run was continued for a period of approximately seven hours. The GLC analyses of samples taken during the last 2⅔ hours of the run were averaged and the results showed a 13.2% conversion based on benzene with a selectivity of 14% to cyclohexane and 75% to cyclohexylbenzene.

EXAMPLE IV

This run was carried out in the same manner as Example III except that the benzene was pumped in at 180 ml./hr. The catalyst bed of Example III was used in this run which was continued for a period of approximately eight hours. The GLC analyses of samples taken during the last 4½ hours of the run were averaged and the results showed a 9.3% conversion based on benzene with a selectivity of 15% to cyclohexane and 75% to cyclohexylbenzene.

EXAMPLE V (A) Catalyst Preparation

The catalyst was prepared as described in Examples I and II using a solution of 0.20 g. ruthenium trichloride and 0.19 g. nickel(II) chloride hexahydrate in 10 ml. ethanol. This solution was sprayed onto 37.7 g. of Filtrol Grade 71 tablets.

(B) Cyclohexylbenzene Run 5 (Table I)

This run was carried out as were the runs in Examples I and II using 30 ml. (27.2 g.) of the catalyst (0.2 wt. percent Ru, 0.1 wt. percent Ni) prepared above. The run was continued for a period of 7¾ hours. The GLC analyses of samples taken during the last 3⅔ hours of the run were averaged and the results showed a 9.6% conversion based on benzene with a selectivity of 15% to cyclohexane and 75% to cyclohexylbenzene.

A summary of the results obtained in Examples I–V is given below in Table I to show the greater selectivity to cyclohexylbenzene of the Ru/Ni catalyst systems (Runs 2–5) over the ruthenium catalyst in Run 1 (control run) (see $CyBz/C_6H_{12}$ ratios).

selectively of 26% to cyclohexane and 64% to cyclohexylbenzene.

EXAMPLE VII (A) Catalyst Preparation

A 22.0 g. portion of Filtrol Grade 49 in a 100 ml. round bottomed flask was treated with a solution of 0.14 g. ruthenium trichloride and 0.22 g. nickel(II) chloride hexahydrate in 40 ml. of ethanol. The ethanol was removed at reduced pressure on a rotary evaporator. The residual solid was transferred to a 500 ml. round bottomed flask, and the 100 ml. round bottomed flask rinsed with two 25 ml. portions of ethanol. These ethanol washings were combined with the residual solid in the 500 ml. round bottomed flask and the ethanol was removed under reduced pressure on a rotary evaporator. The resulting particulate solid was used as a catalyst.

(B) Cyclohexylbenzene Run 7

A charge of 30 ml. (23.9 g.) of the above catalyst (0.25% Ru, 0.25% Ni) was placed in a ½-inch I.D. upflow tube reactor bedded with 30 ml. of 3 mm. glass beads and the catalyst was covered with 10 ml. of 4 mm. glass beads. The reaction was carried out under the same conditions as in Example VI for a period of 8 hours. The GLC analyses of samples taken during the last four hours of the run were averaged and the results showed an 18.2% conversion based on benzene with a selectivity of 18% to cyclohexane and 67% to cyclohexylbenzene.

TABLE I.—CYCLOHEXYLBENZENE FROM BENZENE/$H_2$ OVER IMPREGNATED FILTROL GRADE 71 TABLETS

| Run No. | Metals on Filtrol-71 | Products, weight percent | | | | | | $CyBz/C_6H_{12}$ | Selectivity CyBz percent |
|---|---|---|---|---|---|---|---|---|---|
| | | $C_6H_{12}$ | $C_6H_6$ | Unknown | MeCpBz[1] | CyBz[1] | Heavies[2] | | |
| 1[3] | 0.5% Ru | 3.7 | 84.8 | 0.1 | 0.1 | 9.1 | 2.2 | 2.5 | 60 |
| 2[3] | 0.5% Ru, 0.05% Ni | 2.7 | 87.5 | 0.05 | 0.05 | 8.3 | 1.4 | 1.3 | 66 |
| 3[3] | 0.5% Ru, 0.25% Ni | 1.8 | 86.8 | 0.05 | 0.05 | 10.0 | 1.4 | 5.5 | 75 |
| 4[4] | 0.5% Ru, 0.25% Ni | 1.4 | 90.7 | 0.05 | 0.05 | 7.0 | 0.8 | 5.0 | 75 |
| 5[3] | 0.2% Ru, 0.1% Ni | 1.4 | 90.4 | 0.05 | 0.05 | 7.1 | 1.0 | 5.0 | 75 |

[1] MeCpBz and CyBz represent, respectively, methylcyclopentylbenzene and cyclohexylbenzene.
[2] Heavies were estimated by determining the residue remaining after distillation, and normalization of the GLC data.
[3] LHSV=4.
[4] LHSV=6.

The runs in Table I were carried out in a continuous upflow reactor at 150° C. and 500 p.s.i.g. $H_2$.

The following runs (Examples VII–XI) demonstrate the operability of the present invention on Filtrol Grade 49. Example VI is a control run. Examples VI–XI are summarized in Table II.

EXAMPLE VI (A) Catalyst Preparation (Control Run)

Approximately 120 ml. (80.6 g.) of Filtrol Grade 49 (passing a number 6 screen and held by a number 9 screen) was heated for two hours at 530–570° F. After cooling to room temperature, the material weighed 72.2 g. A 22.0 g. sample was treated with a solution of 0.14 g. ruthenium trichloride in 40 ml. of ethanol. The ethanol was removed on a rotary evaporator to give a residual particulate solid which was used as a catalyst.

(B) Cyclohexylbenzene Run 6

A charge of 30 ml. (23.4 g.) of the above catalyst (0.25% Ru) was placed in a ½-inch I.D. upflow tube reactor bedded with 30 ml. of 3 mm. glass beads and the catalyst was covered with 10 ml. of 4 mm. glass beads. The system was pressure checked, heated to 150° C., pressured to 500 p.s.i.g. $H_2$ and benzene was pumped in at a rate of 120 ml./hr. with a slight hydrogen flow during a reaction period of approximately eight hours. The reactor effluent was collected in a receiver which was changed at approximately one hour intervals, and the composition of each sample was determined by GLC analysis. The GLC analyses of samples taken during the last 4¾ hours of the run were averaged and the results showed a 10.3% conversion based on benzene with a

EXAMPLE VIII (A) Catalyst Preparation

The catalyst was prepared as described in Example VI using a solution of 0.36 g. ruthenium trichloride and 0.3 g. nickel(II) chloride hexahydrate in 40 ml. ethanol. This solution was contacted with 27.9 g. of Filtrol Grade 49 and the ethanol was removed under reduced pressure on a rotary evaporator.

(B) Cyclohexylbenzene Run 8

This run was carried out as were the runs in Examples VI and VII using 30 ml. (22.9 g.) of the catalyst prepared above. The run was continued for approximately eight hours. The GLC analyses of samples taken during the last 4½ hours of the run were averaged and the results showed an 18.8% conversion based on benzene with a selectivity of 22% to cyclohexane and 66% to cyclohexylbenzene.

EXAMPLE IX (A) Catalyst Preparation

The catalyst was prepared by treating 30 g. Filtrol Grade 49 with a solution of 0.20 g. ruthenium trichloride and 0.30 g. nickel(II) chloride hexahydrate in 30 ml. water. The water was removed under reduced pressure on a rotary evaporator.

(B) Cyclohexylbenzene Run 9

This run was carried out as were the previous runs in Examples VI–VIII using 30 ml. (25 g.) of the above catalyst (0.25 wt. percent Ru, 0.25 wt. percent Ni). The run was continued for eight hours. The GLC analyses of samples taken during the last five hours of the run were averaged and the results showed 9.9% conversion based on benzene with a selectivity of 17% to cyclohexane and 72% to cyclohexylbenzene.

EXAMPLE X

(A) Catalyst Preparation

The catalyst was prepared by treating 25 g. Filtrol Grade 49 with a solution of 0.16 g. ruthenium trichloride and 0.25 g. cobalt(II) chloride hexahydrate in 30 ml. ethanol.

The ethanol was removed under reduced pressure on a rotary evaporator.

(B) Cyclohexylbenzene Run 10

This run was carried out as were the runs described in Examples VI–IX using 30 ml. (24.4 g.) of the above catalyst (0.25 wt. percent Ru, 0.25 wt. percent Co). The run was continued for approximately eight hours. The GLC analyses of samples taken during the last five hours of the run were averaged and the results showed 9.5% conversion based on benzene with a selectivity of 22% to cyclohexane and 66% to cyclohexylbenzene.

EXAMPLE XI

(A) Catalyst Preparation

The catalyst was prepared by treating 30 g. Filtrol Grade 49 with a solution of 0.20 g. ruthenium trichloride and 0.27 g. iron(II) chloride tetrahydrate in 30 ml. water. The water was removed under reduced pressure on a rotary evaporator.

(B) Cyclohexylbenzene Run 11

This run was carried out as were the runs of Examples VI–X using 30 ml. (26.3 g.) of the above catalyst (0.25 wt. percent Ru, 0.25 wt. percent Fe). The run was continued for 7¾ hours. The GLC analyses of samples during a 4-hour period of the run were averaged and the results showed 9.9% conversion based on benzene with a selectivity of 22% to cyclohexane and 66% to cyclohexylbenzene.

A summary of the results obtained in Examples VI–XI is given below in Table II to show the greater selectivity to cyclohexylbenzene of the Ru/Ni, Ru/Co and Ru/Fe catalysts of Examples VII, VIII, IX, X and XI over the ruthenium catalyst of Example VI (no metal promoter). The larger CyBz/$C_6H_{12}$ ratios of runs 7, 8, 9, 10 and 11 compared to run 6 (control run) are to be noted.

presence of acid catalysts such as aluminum chloride, ferric chloride, zinc chloride, boron trifluoride, stannic chloride, polyphosphoric acid, hydrogen fluoride, antimony pentafluoride, and the like. Alternatively, heterogeneous catalysts such as silica-alumina clays, zeolites, supported phosphoric acid, fluorided alumina, and the like can also be used.

EXAMPLE XII

(A) Catalyst Preparation

The catalyst was prepared as described in Example VI using a solution of 0.28 g. ruthenium trichloride and 0.44 g. nickel(II) chloride hexahydrate in 40 ml. ethanol. This solution was contacted with 22.0 g. of Filtrol Grade 49 and the ethanol was removed under reduced pressure on a rotary evaporator.

(B) Cyclohexylbenzene Run

This run was carried out as were the runs in Examples VI–VIII using 30 ml. (24.4 g.) of the catalyst prepared above (0.25 wt. percent Ru, 0.5 wt. percent Ni). The run was continued for approximately eight hours. The GLC analyses of samples taken during the last five hours of the run were averaged and the results showed 15.7% conversion based on benzene with a selectivity of 27% to cyclohexane and 60% to cyclohexylbenzene.

It will be observed from this example that as the amount of metal promoter (Ni) is increased to a Ru/Ni ratio of 1:2 that selectivity decreases in comparison with runs in Table II where the ratio of Ru/metal promoter was 1:1.

In summary, the preferred embodiment of the present invention is a process which comprises contacting benzene preferably containing little if any sulfur at a temperature of 110 to 175° C. at a LHSV of 2 to 15, and under hydrogen pressure of 200 to 1,000 p.s.i.g., with a catalyst comprising ruthenium halide on an active clay support promoted with at least one compound of iron, cobalt and nickel, which catalyst has been prepared by impregnation of the active clay with an aqueous or alcoholic solution of ruthenium trichloride and a chloride of at least one of iron, cobalt and nickel followed by removal of the solvent by heating under noncalcination conditions at a temperature below about 380° C. Cyclohexylbenzene is recovered from the reaction mixture.

We claim:

1. A process for producing cycloalkylaromatics and alkyl-substituted cycloalkylaromatics by contacting a monocyclic aromatic hydrocarbon or alkyl-substituted TABLE II.[1]—CYCLOHEXYLBENZENE FROM BENZENE/$H_2$ OVER IMPREGNATED FILTROL 49 CATALYSTS

| Run No. | Metal on Filtrol 49 | Products, weight percent | | | | | | | Selectivity, CyBz percent |
|---|---|---|---|---|---|---|---|---|---|
| | | $C_6H_{12}$ | $C_6H_6$ | Unknown | MeCpBz[2] | CyBz[2] | Heavies[3] | CyBz/$C_6H_{12}$ | |
| 6 | 0.25% Ru | 2.7 | 89.7 | 0.05 | 0.05 | 6.6 | 0.9 | 2.5 | 64 |
| 7 | 0.25% Ru, 0.25% Ni | 3.2 | 81.8 | 0.1 | 0.1 | 12.2 | 2.7 | 3.7 | 67 |
| 8 | 0.50% Ru, 0.25% Ni | 4.0 | 81.2 | 0.1 | 0.1 | 12.1 | 2.5 | 3.0 | 64 |
| 9 | 0.25% Ru, 0.25% Ni | 1.7 | 90.1 | Trace | 0.05 | 7.1 | 1.0 | 4.2 | 72 |
| 10 | 0.25% Ru, 0.25% Co | 2.1 | 90.5 | 0.05 | 0.1 | 6.3 | 0.9 | 3.0 | 66 |
| 11 | 0.25% Ru, 0.25% Fe | 2.2 | 90.1 | 0.05 | 0.1 | 6.5 | 1.0 | 3.0 | 66 |

[1] Filtrol 49 extrudate was heated at 550–570° F. for two hours prior to use. The Filtrol 49 passing a number 6 screen but held by a number 9 screen was used in preparing the catalysts for the runs listed in Table II.
[2] MeCpBz and CyBz represent, respectively, methylcyclopentylbenzene and cyclohexylbenzene.
[3] Heavies were estimated by determining the residue remaining after distillation, and normalization of the GLC data.

The heavies produced in the present invention cyclohexylbenzene process can be equilibrated with benzene in the presence of a Lewis acid such as aluminum chloride to increase the yield of the desired cyclohexylbenzene. The major by-product components (75 weight percent of the heavies) produced in run 7 of Table II were polycycloalkylaromatics such as dicyclohexylbenzenes and tricyclohexylbenzenes. A benzene solution containing 9.5% heavies in the presence of aluminum chloride at room temperature gave a product containing 1.9% heavies. Thus, about 13.5 g. of heavies gave after hydrolysis and distillation 12.6 g. of cyclohexylbenzene. As is well known in the art, the transalkylation of polycycloalkylaromatics with aromatics can be effected in the monocyclic aromatic hydrocarbon with hydrogen in the presence of a ruthenium halide-active clay catalyst comprising 0.01 to about 2 weight percent ruthenium promoted with from 0.001 to about 3 weight percent of at least one compound of iron, cobalt and nickel in a weight ratio of ruthenium to promoter metal in the range 10:1 to 1:1.5 under conditions sufficient to substantially convert said monocyclic aromatic hydrocarbons to cycloalkyl-aromatics and alkyl-substituted cycloalkylaromatic hydrocarbons.

2. A process according to claim 1 wherein benzene is converted to cyclohexylbenzene by contacting benzene and hydrogen with a ruthenium chloride-montmorillonite active clay catalyst promoted with a halide of iron, cobalt and nickel, and mixtures thereof.

3. A process according to claim 1 wherein said catalyst is prepared by impregnating an active clay with an alcoholic or aqueous solution of a ruthenium halide and at least one compound of iron, cobalt and nickel followed by removal of alcohol or water by heating at a temperature sufficient to volatilize said alcohol or water and remove same from said catalyst but insufficient to calcine the catalyst.

4. A process according to claim 1 wherein said contacting is effected at a temperature of from about 100° C. to about 250° C. at a hydrogen pressure of from about 100 p.s.i.g. to about 2,000 p.s.i.g.

5. A process according to claim 1 wherein benzene is converted to cyclohexylbenzene with a ruthenium chloride-montmorillonite active clay catalyst promoted with a halide of at least one of iron, cobalt or nickel with the further proviso that the ruthenium chloride and promoter metal halide are applied to the active clay support in an ethanolic solution and the ethanol is removed from the catalyst by heating at an elevated temperature sufficient to volatilize and remove the ethanol therefrom but insufficient to cause calcination of the catalyst.

6. A process according to claim 1 wherein benzene and hydrogen are contacted to form cyclohexylbenzene in the presence of a ruthenium-active clay catalyst promoted with nickel with the further proviso that the amount of ruthenium present is in the range of 0.1 to 1 weight percent and the amount of nickel present is in the range of 0.05 to 1 weight percent, and the weight ratio of ruthenium to nickel is in the range 10:1 to 1:1.5.

7. A process according to claim 1 wherein benzene and hydrogen are contacted to form cyclohexylbenzene in the presence of a ruthenium-active clay catalyst promoted with cobalt with the further proviso that the amount of ruthenium present is in the range of 0.1 to 1 weight percent and the amount of cobalt present is in the range of 0.05 to 1 weight percent, and the weight ratio of ruthenium to cobalt is in the range 10:1 to 1:1.5.

8. A process according to claim 1 wherein benzene and hydrogen are contacted to form cyclohexylbenzene in the presence of a ruthenium-active clay catalyst promoted with iron with the further proviso that the amount of ruthenium present is in the range of 0.1 to 1 weight percent and the amount of iron present is in the range of 0.05 to 1 weight percent, and the weight ratio of ruthenium to iron is in the range 10:1 to 1:1.5.

9. A process according to claim 1 wherein said contacting is effected at a temperature of about 110° C. to about 175° C., a hydrogen pressure in the range of about 200 to about 1,000 p.s.i.g., and a liquid hourly space velocity (LHSV) in the range of 2 to 15.

10. A process according to claim 9 wherein a liquid phase of benzene and hydrogen is passed through a bed of Filtrol Grade 71 active clay catalyst promoted with ruthenium and nickel.

11. A process according to claim 9 wherein a liquid phase of benzene and hydrogen is passed through a bed of Filtrol Grade 49 active clay catalyst promoted with ruthenium and one of nickel, cobalt or iron.

References Cited

UNITED STATES PATENTS

| | | | |
|---|---|---|---|
| 3,760,017 | 9/1973 | Arkell et al. | 260—668 R |
| 3,760,018 | 9/1973 | Suggitt et al. | 260—668 R |
| 3,760,019 | 9/1973 | Crone et al. | 260—668 R |
| 2,952,716 | 9/1960 | Haensel | 260—683.65 |
| 3,153,678 | 10/1964 | Logemann | 260—667 |
| 3,274,276 | 9/1966 | Louver | 260—671 R |
| 3,317,611 | 5/1967 | Louver et al. | 260—668 F |
| 3,347,945 | 10/1967 | Slaugh | 260—668 F |
| 3,391,206 | 7/1968 | Hartog | 260—667 |
| 3,412,165 | 11/1968 | Slaugh et al. | 260—668 R |

CURTIS R. DAVIS, Primary Examiner

U.S. Cl. X.R.

260—667